Aug. 23, 1932.  E. A. THOMPSON  1,873,725
POWER TRANSMISSION MECHANISM
Filed Jan. 3, 1924  4 Sheets-Sheet 4
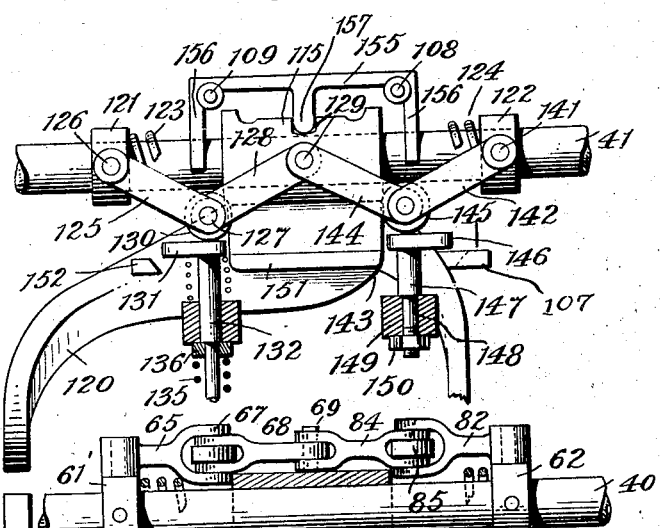
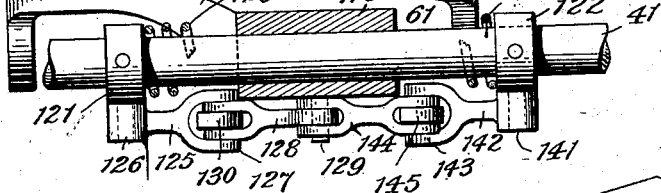
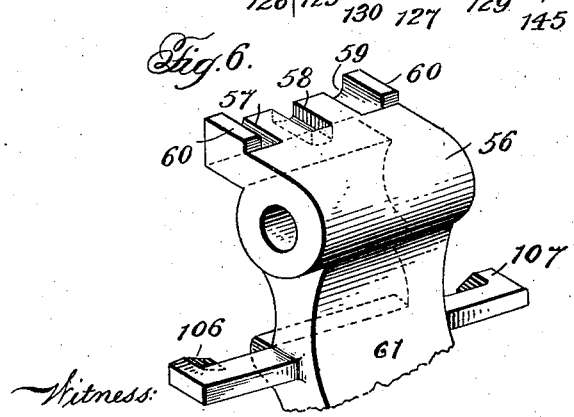
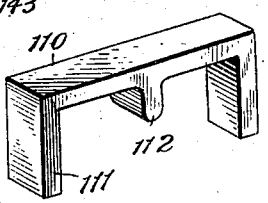
Inventor:
Earl A. Thompson,
By Milans & Milans Attorneys.
Witness:
Jas E. Hutchinson.

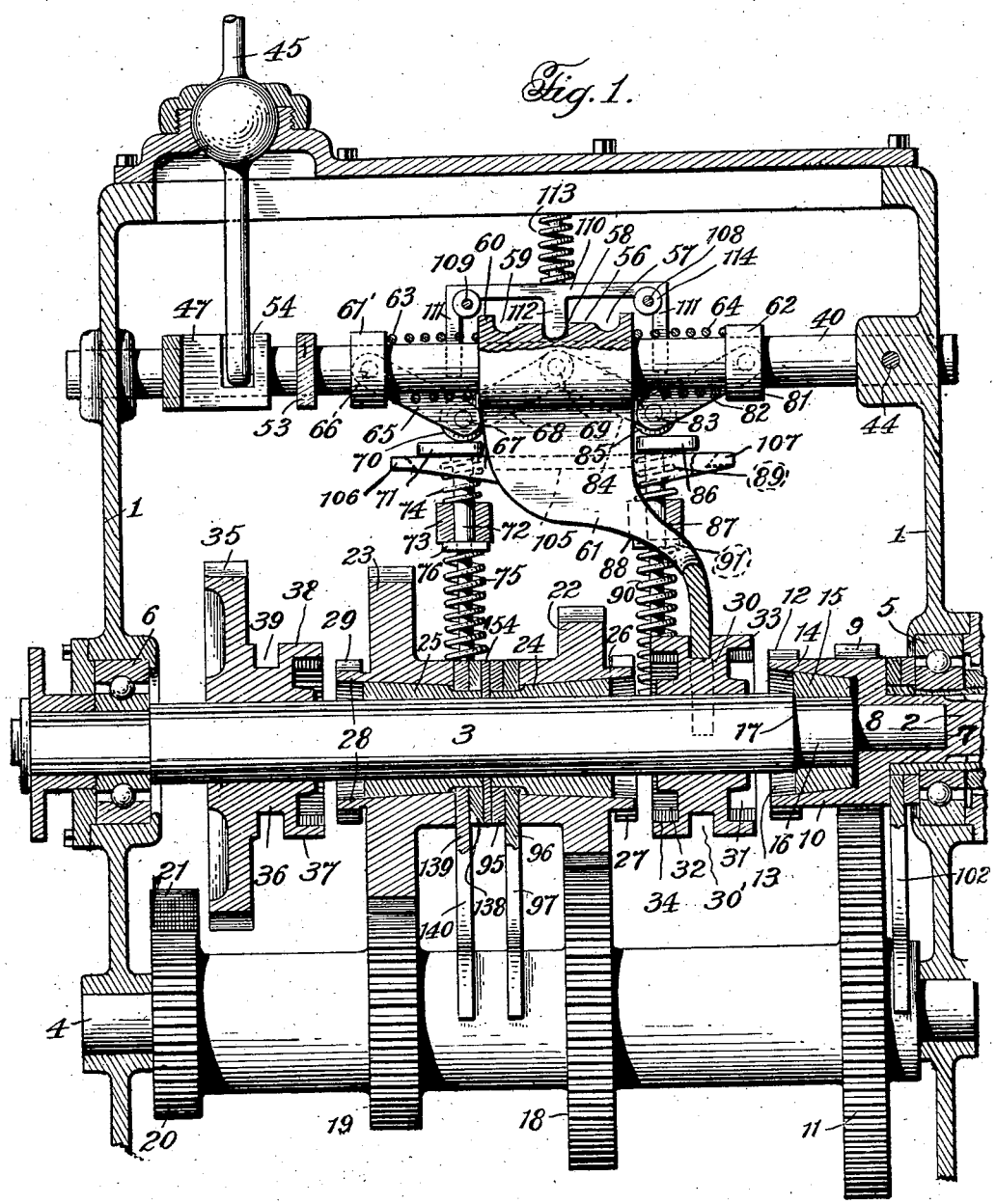

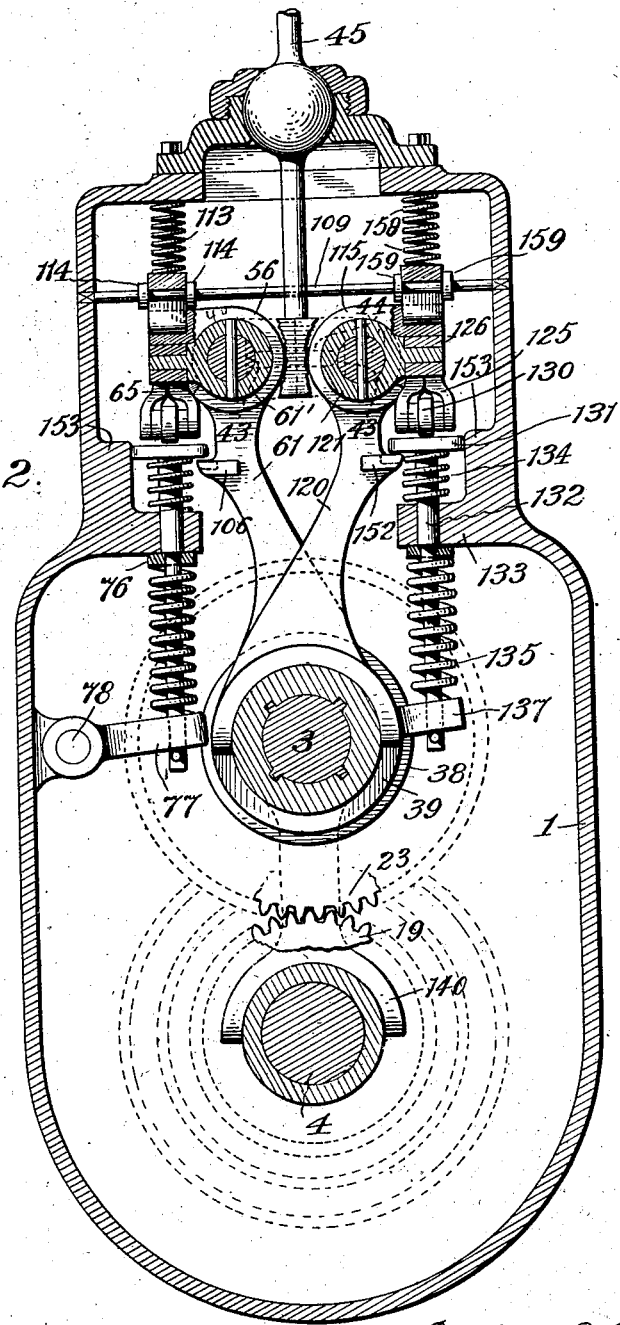

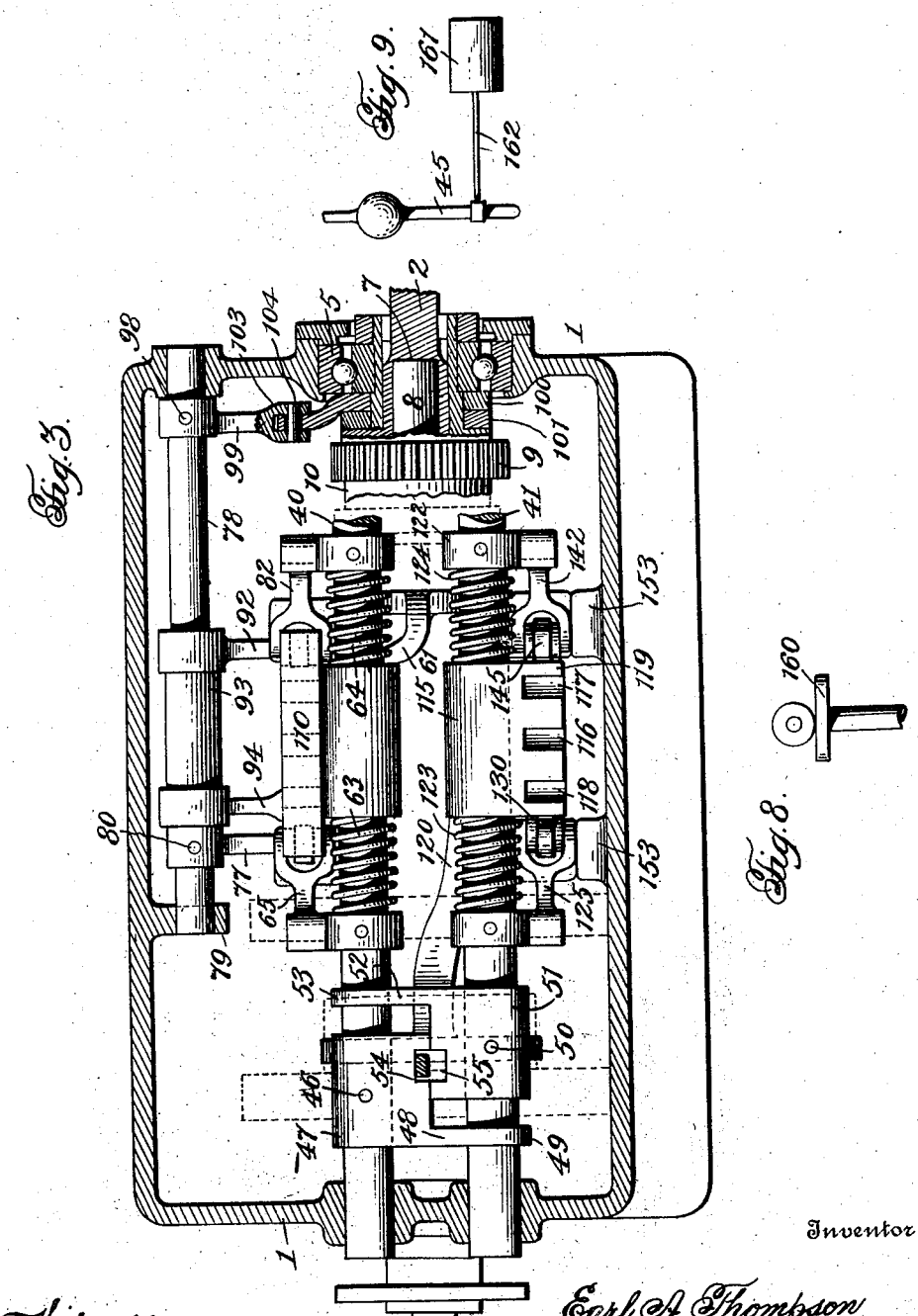

Patented Aug. 23, 1932

1,873,725

UNITED STATES PATENT OFFICE

EARL A. THOMPSON, OF PORTLAND, OREGON, ASSIGNOR TO GENERAL MOTORS CORPORATION, OF DETROIT, MICHIGAN, A CORPORATION OF DELAWARE

POWER TRANSMISSION MECHANISM

Application filed January 3, 1924. Serial No. 684,173.

My invention relates to new and useful improvements in a variable speed power transmission mechanism and while the same may be used in various places where transmissions are used is primarily intended for use in motor vehicles where a hand lever is used for connecting the driving and driven members.

The principal object of the invention resides in the provision of a transmission having means for synchronizing the driving and driven members so as to allow them to be connected without any clash or shock.

A further object of the invention consists in the provision of a transmission in which a hand lever is used for shifting to different speeds or into reverse, the movement of said hand lever also setting into operation means whereby the speeds of the driving and driven members are synchronized prior to their connection to prevent clash or shock.

Still another object of the invention resides in the provision of means whereby the shiftable members of the transmission are held in neutral position during the synchronizing operation, a stopping or retarding action being provided to so hold the parts temporarily in neutral position a sufficient length of time to allow for the synchronizing, the duration of said stop or retarding depending upon the pressure or force exerted on the hand lever by the operator.

With the above and other objects in view, which will appear as the description proceeds, my invention consists in the novel details of construction and arrangements of parts described in the following specification and illustrated in the accompanying drawings, and while I have illustrated and described the preferred embodiments of the invention as they now apear to me it will be understood that such changes may be made as will fall within the scope of the appended claims.

In the drawings:—

Fig. 1 is a side elevation with parts shown in longitudinal vertical section.

Fig. 2 is a transverse vertical section with parts shown in elevation.

Fig. 3 is a horizontal section with parts shown in top plan.

Fig. 4 is a detail showing in side elevation one of the shifter fork hubs, shifter fork, locking means therefore, and synchronizer operating means.

Fig. 5 is a top plan of Fig. 4 with parts shown in longitudinal section.

Fig. 6 is a perspective view of one of the shifter fork hubs.

Fig. 7 is a perspective view of one of the locks for the shifter fork hubs.

Fig. 8 is a fragmental side elevation of a slightly modified form of head for the synchronizer rods, and Fig. 9 is a fragmental side elevation of the modification, showing a dash pot connected to the operating lever.

The disagreeable gear clashing so common in transmissions ordinarily in use in motor vehicles is well known to operators of motor vehicles and in order to prevent said gear clashing, in the transmissions ordinarily in use, it is left to the judgment of the operator to synchronize the speeds of the gears before connecting or intermeshing the gears. With the form of transmission which I have illustrated and will describe in detail there are mechanical means for causing the synchronization, said mechanical means being brought or moved into operation by the hand lever after the shiftable members have been moved into neutral position. It can be appreciated that there must be a sufficient lapse of time before moving the shiftable members again into operative position for the synchronizing to take place and I have provided novel means whereby there will be a temporary stopping or retarding of the movement of the shiftable members to allow for said synchronizing, the duration of said stopping or retarding depending upon the pressure or force used by the operator upon the lever which, it will be understood, may be varied by the conditions of the shift.

In the drawings 1 indicates the transmission casing or housing, 2 the clutch shaft, 3 the driven shaft, and 4 the counter shaft, said counter shaft, as usual, being mounted below the driven shaft and in vertical alignment therewith. The clutch shaft 2 and the driven shaft 3 are supported in the usual manner by the ball-bearings 5 and 6, the clutch shaft having a socket 7 which receives the reduced portion 8 formed on one end of the driven member 3. A clutch gear 9 is formed on or secured to the head 10 of the clutch shaft and meshes with the gear 11 formed on or secured to the counter shaft 4. Teeth 12 are formed adjacent the outer end of the head 10 of the clutch shaft 2, for a purpose which will be later described, and said clutch head 10 is formed in its outer end with a recess 13, the walls of which are inwardly tapered as shown at 14 to be engaged by a correspondingly tapered collar or bearing 15 which is secured to a reduced portion 16 of the driven shaft 3 said reduced portion 16 forming a shoulder 17 against which the inner end of the collar 15 will engage as more particularly shown in Fig. 1 of the drawings. Gears 18, 19 and 20 are formed on or secured to the counter shaft 4 in longitudinally spaced relation, the gear 18 being of less diameter than the gear 11, the gear 19 of less diameter than the gear 18, and the gear 20 being of less diameter than the gear 19. A reverse idler 21 is in constant mesh with the gear 20 for reversing purposes as will be later more clearly described. Gears 22 and 23 are carried by the driven shaft 3 and are rotatably mounted upon conical bearings 24 and 25, respectively, said bearings being secured to the shaft 3 against both rotatable and longitudinal movement with respect thereto. Each conical bearing constitutes one element of a friction clutch adapted to be frictionally engaged with its companion formed by the conical bore within the gear 22 or 23. The gear 22 is in constant mesh with the gear 18 and the gear 23 is in constant mesh with the gear 19 as more clearly illustrated in Fig. 1 of the drawings. An extension 26 is formed on the outer face of the gear 22 and is provided with the teeth 27. An extension 28 is formed on the outer face of the gear 23 and is provided with the teeth 29. Connected to the shaft 3, against rotation relative thereto, but adapted for sliding movement is a positive clutch member 30 which is formed in one face with a recess 31 and in the opposite face with a recess 32, teeth 33 being formed on the outer periphery of the recess 31 and teeth 34 being formed on the outer periphery of the recess 32. When the clutch member 30 is shifted to the right, as shown in Fig. 1, the teeth 33 will mesh with the companion teeth 12 on the head 10 of the clutch shaft 2 and when moved to the left the teeth 34 will mesh with the companion teeth 27 formed on the extension 26 of the gear 22. The clutch member 30 has a circumferentially extending groove 30′ to receive a shifter fork to be later described.

A gear 35 is mounted upon the driven shaft 3 and is held against rotary movement with respect thereto but adapted to be longitudinally shifted in a manner to be later described. This gear is provided on one face with the reduced extension 36 which is formed at its outer end with an enlarged head 37 provided with the interior teeth 38 adapted when the gear is shifted to the right, Fig. 1 of the drawings, to mesh with the teeth 29 formed on the extension 28 of the gear 23. When the gear 35 is moved to the left of Fig. 1 it will mesh with the reverse idler 21. The enlarged head 37 formed on the end of the extension 36 forms a circumferentially extending groove 39 to receive a shifter fork to be later described.

Mounted in and extending longitudinally of the housing or casing 1 are the shifter rods 40 and 41 which are adapted for longitudinal sliding movement, the ends of the rods passing through the ends of the housing or casing 1 which form a support therefor. Adjacent one end the rods 40 and 41 are provided with a notch or recess 43 to receive the interlocking plunger 44, in the usual manner, which holds these rods in such a manner that they cannot both be simultaneously operated but one must be operated at a time. The rods are adapted to be moved by the hand lever 45 which is supported, in the usual manner, in the cover of the transmission casing for universal swinging movement. Secured to the rod 40, by a pin 46 or other suitable fastening, is a block 47 which has an arm 48 provided with an eye 49 through which the rod 41 passes, said arm, receiving the rod 41, preventing rotation of the rod 40 during its sliding movement as will be readily appreciated. Secured to the rod 41 by means of a pin 50 or other suitable fastener is a block 51 which has the arm 52 provided with an eye 53 through which the rod 40 passes, this arm 52 preventing rotation of the rod 41 during the sliding movement thereof. The blocks 47 and 51 are provided on their inner faces with the notches or recesses 54 and 55, respectively, and the lower end of the hand operating lever 45 will extend into these notches or recesses in the usual manner so that when the lever is swung transversely of the housing or casing the lower end thereof will be received in one or the other of the nothces or recesses so that, when the lever is moved forwardly or rearwardly with respect to the casing or housing, one or the other of the rods 40 or 41 will be shifted forwardly or rearwardly to bring into operation the various driving members.

Mounted on the rod 40 for sliding movement relative thereto and therewith is a shifter fork hub 56 which is provided on its upper surface with the recesses 57, 58 and 59, projections 60 being formed at the ends of the hub, adjacent the recesses 57 and 59 for a purpose which will be later described. Formed integral with this hub is the shifter fork 61 the lower end of which is received in the circumferentially extending groove 30' of the shiftable member 30 to move said shiftable member upon sliding movement of the hub.

Secured to the rod 40 in longitudinally spaced relation, and on opposite sides of the shifter fork 56 are the collars 61' and 62, a coiled spring 63 surrounding the rod 40 between the collar 61' and one end of the hub and a coiled spring 64 surrounding the rod between the collar 62 and the opposite end of the hub. A link 65 is pivotally connected at 66 to the collar 61' and its lower end is pivotally connected at 67 to the link 68 which in turn is pivotally connected to the hub 56 at 69. A roller 70 is carried by the pivot pin 67 and normally engages the upper surface of the head 71 formed on the upper end of a vertically extending rod 72, the rod 72 extending through an opening formed in an inwardly extending bearing projection 73 formed interiorly of the casing or housing 1. A coiled spring 74 surrounds the rod 72 between the under surface of the head 71 and the upper surface of the bearing 73 and a coiled spring 75 surrounds said rod 72 between a washer 76 and the upper surface of an arm 77 which is secured to the longitudinally extending shaft 78 supported interiorly of the casing or housing 1 by means of the brackets 79. By reference to Fig. 3 it will be seen that the arm 77 is secured to said shaft 78 by means of the pin 80. Pivotally connected to the collar 62 at 81 is a link 82 which is pivotally connected at its lower end by the pivot pin 83 to the lower end of the link 84, the upper end of said link 84 being pivotally connected at 69 to the hub 56. A roller 85 is carried by the pivot pin 83 and normally engages the upper surface of the head 86 formed on the upper end of a vertically extending rod 87 which passes through the bearing 88 formed on the inside of the housing or casing. A coiled spring 89 surrounds the rod 87 between the under surface of the head 86 and the upper surface of the bearing 88 and a coiled spring 90 surrounds said rod 87 between the washer 91 and the arm 92 formed on one end of a sleeve 93 which is rotatably mounted upon the shaft 78. Formed on the opposite end of the sleeve 93 is an arm 94 which is connected to operate the movable member of a clutch crowder indicated generally at 95, the stationary member of the crowder device being shown at 96. The stationary member 96 of said device is prevented from rotation by means of the arm 97 engaging with the counter shaft 4 as more clearly shown in Figs. 1 and 2 of the drawings. Secured to the shaft 78 by means of the pin 98 or other suitable fastening is an arm 99 which is pivotally connected to the movable member 100 of a clutch crowder device, the stationary member of said device being shown at 101 and provided with a downwardly extending arm 102 which engages the counter shaft 4 to prevent rotation thereof. The movable member 100 of the clutch crowder device is provided with a slot 103, as shown more particularly in Fig. 3 of the drawings, to receive the pivot pin 104.

Formed on one face of the fork 61 is a shelf or flange 105 which is adapted, when the fork is moved, to engage beneath the heads 71 and 86 in a manner and for a purpose which will be later described. Also formed on the face of the fork 61, at opposite edges thereof, are the beveled projections 106 and 107, the beveled projection 106 adapted to engage beneath the head 71 and the beveled projection 107 adapted to be engaged beneath the head 86 when the fork 61 is moved in opposite directions. The purpose of these projections will be later more fully brought out in the description of the operation of the parts.

Mounted transversely of the casing or housing 1, adjacent the top thereof, as more particularly illustrated in Figs. 1 and 2 of the drawings, are the longitudinally spaced rods 108 and 109. Carried by these rods 108 and 109 is a locking member for the shifter fork hub 56 and this locking member comprises the horizontal portion 110 and the depending end portions 111, the rods 108 and 109 normally being received in the corners of the locking member as more clearly illustrated in Fig. 1 of the drawings. Depending from the horizontal portion 110 is a projection 112 which is adapted to engage in the notches or recesses 57, 58 and 59 which are formed in the top surface of the hub as has been previously described. A coiled spring 113 is interposed between the top of the casing or housing 1 and the upper surface of the horizontal portion 110 of the lock and normally holds the locking member in its lowermost position with the projection 112 in one of the recesses or notches previously described. Collars 114 are formed on or secured to the rods 108 and 109 to engage opposite sides of the locking member to prevent transverse movement thereof upon the rods and to form guides in the vertical movement of the locking members.

Mounted on the rod 41 for sliding movement relative thereto and therewith is a shifter fork hub 115 which is provided on its upper surface with the recesses 116, 117 and 118, projections 119 being formed on the ends of the hub, adjacent the recesses 117 and 118 for a purpose which will be later described. Formed integral with this hub is a shifter fork 120 the lower end of which is received in the circumferentially extending groove 39 of the shiftable member 36 to move said shiftable member upon sliding movement of the hub.

Secured to the rod 41 in longitudinally spaced relation, and on opposite sides of the shifter fork hub 115 are the collars 121 and 122. A coiled spring 123 surrounds the rod 41 between the collar 121 and one end of the hub 115 and a coiled spring 124 surrounds the rod between the collar 122 and the opposite end of the hub. A link 125 is pivotally connected at 126 to the collar 121 and its lower end is pivotally connected at 127 to the link 128 which in turn is pivotally connected to the hub 115 at 129. A roller 130 is carried by the pivot pin 127 and normally engages the upper surface of the head 131 formed on the upper end of a vertically extending rod 132, the rod 132 extending through an opening formed in an inwardly extending bearing projection 133 formed interiorly of the casing or housing 1. A coiled spring 134 surrounds the rod 132 between the under surface of the head 131 and the upper surface of the bearing 133 and a coiled spring 135 surrounds said rod 132 between a washer 136 and the upper surface of an arm 137 which is formed on or secured to the movable member 138 of a crowder clutch, the stationary member of said crowder clutch being indicated at 139 and provided with a downwardly extending arm 140 which engages the counter shaft 4 to prevent rotation of said member. Pivotally connected to the collar 122 at 141 is a link 142 which is pivotally connected at its lower end by the pivot pin 143 to the lower end of the link 144, the upper end of said link 144 being pivotally connected at 129 to the hub 115. A roller 145 is carried by the pivot pin 143 and normally engages the upper surface of the head 146 formed on the upper end of a vertically extending stud 147, the lower end of this stud being reduced as shown at 148 and the reduced portion extending through an opening formed in a bearing 149 extending inwardly from the housing or casing 1. The lower end of the reduced portion 148 will be exteriorly threaded to receive the nut 150, the upper end of the reduced portion forming a shoulder which engages the upper surface of the bearing and the nut 150 engaging the lower surface of said bearing. Formed on one face of the fork 120 is the longitudinally extending shelf 151 which is adapted to engage under the head 131 when the hub is moved towards the left as shown in the drawings and also formed on the same face of the fork is a beveled projection 152 which will engage under the head when the hub and fork are moved in the opposite direction. The purposes of this shelf and beveled projection will be later described.

Extending inwardly, from opposite sides of the housing or casing 1 are the lugs or projections 153 which, as more particularly shown in Figs. 2 and 3 of the drawings, engage one edge of the heads 71, 86, and 131 to guide said heads in their vertical movement and to prevent rotation thereof.

Mounted upon the shaft 3 between the movable members 95 and 138 of the clutch crowder devices is a thrust collar 154 which forms an abutment for the ends of the conical bearings 24 and 25.

Carried by the rods 108 and 109 is a locking member for the shifter fork hub 115. This locking member comprises the horizontal portion 155 and the depending end portions 156 the rods 108 and 109 normally being received in the corners of the locking member. Depending from the horizontal portion 155 is a projection 157 which is adapted to engage in the notches or recesses 116, 117 and 118 which are formed in the top surface of the hub 115 as has been previously described. A coiled spring 158 is interposed between the top of the casing or housing 1 and the upper surface of the horizontal portion 155 of the lock and normally holds the locking member in its lowermost position with the projection 157 in one of the recesses or notches previously described. Collars 159 are formed on or secured to the rods 108 and 109 to engage opposite sides of the locking member to prevent transverse movement thereof upon the rods and to form guides in the vertical movement of the locking member.

In Fig. 8 of the drawings I have shown a slightly modified form of the head which is formed on the upper ends of the rods which operate the movable members of the crowder clutch. In this form of the invention the head 160 is elongated and the purpose of this will be brought out in the description to follow.

Having described the detailed construction of my device it is thought that the construction will be clearly understood and I will now endeavor to more in detail bring out the operation thereof. As shown in the drawings the parts are in neutral position and when in such positions the clutch gear 9 meshes with the gear 11, the gear 18 meshes with the gear 22, the gear 19 meshes with the gear 23 and the gear 35 is to one side of the gear 21 and out of mesh therewith. With the engine started and the main clutch engaged, the clutch shaft 2 will rotate and through the clutch gear 9 and gear 11 rotate the counter shaft 4 which in turn through means of the gears 18 and 19 will rotate the gears 22 and 23 which are free to revolve. Of course, the gear 20 will rotate the reverse idler gear 21. The first step in engaging the driving members will be to shift to low speed and to do this the main clutch is disengaged in the usual manner and then the hand shifting lever 45 is engaged and moved so that the lower end thereof will be swung into the notch 55 of the block 51 and then the upper end of the lever will be drawn rearwardly, (where I use the term rearwardly it will be understood that this is to the left of Figs. 1 and 3 of the drawings) to swing the lower end of the lever forwardly (when I say forwardly in the following description it will be understood that this is to the right of Figs. 1 and 3 of the drawings), this movement sliding the block 51 and the shifter rod 41 to which it is secured forwardly, the interlock 44 being moved, in the usual manner, to allow this sliding movement to take place. As the shifting rod 41 moves forwardly it carries with it the collars 121 and 122 and the shifter fork hub 115 will be held by the lock therefor. As the shifter rod moves forwardly the positions of the links 125 and 128 will be so changed as to lower the roller 130 and as the roller engages the head 131 the rod 132 will be depressed against the tension of the springs 134 and 135 and will rotate the movable member 138 of the crowder clutch and this will cause the gear 23 to be moved into frictional engagement with the conical bearing 25 and the speed of the gear 23 will be synchronized with the speed of the shiftable member 36 which is keyed to and rotatable with the shaft 3. At the same time that this is taking place the movement of the collar 122 is causing the links 142 and 144 to be drawn into a substantially horizontal position to raise the roller 145 which when raised will engage the vertical arm 156 of the locking member thereby raising the projection 157 from the recess 116. With the projection 157 removed from the recess the coiled spring 123, assisted by the springs 134 and 135 around the rod 132 will cause the shifter fork hub 115 to be moved forwardly in the direction of the movement of the rod 41 previously described and this movement of the shifter fork hub will draw the fork 120 forwardly which in turn will move the shiftable member 36 towards the gear 23 and mesh the teeth 38 thereof with the teeth 29 of said gear 23. The movement of the shifting fork hub by the action of the springs will draw the roller 130 from engagement with the head 131 and then the springs 134 and 135 will force the rod 132 upwardly into its original position thus releasing the crowder clutches. The movement of the shiftable member 36 into engagement with the gear 23 will push the said gear 23 to release the same from tight frictional engagement with the conical bearing 25. If the teeth of the shiftable member should not properly mesh with the teeth 29 carried by the gear it will be seen that the engagement of the teeth, in the shifting movement, forcing the gear 23 free of the bearing will allow a sufficient rotation of the gear 23 for the teeth to mesh. As the shifter fork hub is moved from its original position disclosed the projection 157 will be yieldingly received in the recess 118 and thereby the hub will be held in its shifted position. As the shifting fork 120 is moved the beveled projection 152 will engage under the head 131 so that if, for any reason, the springs do not properly raise the rod 132 this beveled projection will positively return the rod to its original or raised position and thereby release the crowder clutch. I now have the gears in low gear and it is desired to shift to second speed. The upper end of the hand lever 45 is engaged and pushed forwardly to neutral position and as this is done the rod 41 will be drawn rearwardly and through means of the links 142 and 144, the roller 145 engaging the head 146, the shifter fork hub 115 will be slid rearwardly, without lost motion between the rod and hub and this movement of the hub will cause the fork 120 to move the shiftable member 36 out of engagement with the teeth 29 of the gear 23. The movement of the hub 115 will allow the projection 157 to pass from the depression 118 back into the depression 116 which will hold it in locked position. With the lever thus in neutral position it is moved laterally to engage the lower end thereof into the recess 54 of the block 47 and the upper end of the lever is then moved forwardly and this will cause the rod 40 to be moved rearwardly or to the left of the position disclosed in the drawings. The movement of the rod 40, through means of the link connections 82 and 84, causes the roller 85 to be depressed and through its engagement with the head 86 of the rod 87 to lower said rod and through means of the arm 92, sleeve 93 and arm 94 operate the movable member 95 of the crowder clutch and thus force the gear 22 into tight frictional engagement with the conical bearing 24 and synchronize the speed of the gear 22 with the speed of the shiftable member 30 which is rotated with the shaft 3 so that when the shiftable member 30 is moved towards the gear 22 the teeth 27 of the gear 22 will mesh with the teeth 34 of the shiftable member without clash. During the movement of the rod 40 described the links 65 and 68 will be drawn upwardly into substantially horizontal position so that the roller 70 will engage the depending arm 111 of the locking member thereby raising the same to release the locking projection 112 from the recess 58. When thus released the coiled springs 64 aided by the springs surrounding the rod 87 will cause the shifter fork hub to be moved in the same direction that the rod has been previously moved. This movement of the hub causes the shifter fork 61 to move the shifting member 30 so that the teeth 34 thereof will mesh with the teeth 27 of the gear 22 and the gear 22 will rotate with the shifting member and the shaft to which it is keyed. When the shifter hub has been moved the projection 112 will be received in the recess 57 and thus hold the hub in its shifted position. If, for any reason, the teeth 27 and 34 do not properly mesh initially the engagement of the teeth, in the movement of the shifting member will force the gear 22 from its tight engagement with the conical bearing so that it may rotate sufficiently for the teeth to mesh. As the hub is moved to the position just described the flange or shelf 105 will engage beneath the head 71 on the rod 72 and the beveled projection on the fork 61 will engage beneath the head 86 of the rod 87 so that if the same has not properly returned to its initial position, after the roller 85 has passed therefrom it will be positively returned to position. The gears are now in second speed. It is now desired to move to high speed and the lever 45 is again grasped, the main clutch having previously been released, and the upper end thereof drawn rearwardly so as to again move the block 47 and return the parts to neutral position. A continued movement of the lever, as just described, will force the rod 40 rearwardly, or towards the right, as shown in the drawings, and this movement will cause the roller 70 to be lowered, through means of its link connections, and thus lower the rod 72 which through means of the arms 77 and 99 operates the movable member 100 of the crowder clutch and thereby force the clutch gear head 10 into tight frictional engagement with the conical bearing 15. The movement of the rod 40 in the direction described throws the links 82 and 84 in a substantially horizontal position so that the roller 85 will engage the depending arm 111 of the locking member to cause the locking projection 112 to be raised from the recess 58 and the spring 63, aided by the spring surrounding the rod 72 will force the shifter fork hub in the direction of the movement of the rod 40 and through means of the fork 61 shift the member 30 so that the teeth 33 thereof will engage the teeth 12 of the clutch head 10. As the roller 70 passes from the head 71 the crowder clutch will be released and the engagement of the shifting member 30 with the clutch head will release the member 10 from frictional engagement with the conical bearing 15 and if the teeth do not properly mesh they will do so in the manner as has been previously described. With the hub moving in the direction just described the shelf 105 will engage beneath the head 86 and the beveled projection 106 will engage the head 71 to positively raise the rod 72. The gears are now in high speed and may be again moved in neutral position for reverse operation. It might be said that when the shelf or latch 105 engages beneath either the head 71 or 86 that that head is held in raised position so that in operating the rod 40 in reverse direction the roller engaging the head positions the links in such a manner that the shifter fork hub will be moved into neutral position without lost motion between the hub and the rod.

Supposing the parts to be in their neutral position and it is desired to go into reverse it can readily be seen that by operating the hand lever 45 to move the rod 41 rearwardly that the shifter fork 120 will move the gear 35 so as to mesh with the reverse idler 21 and reverse movement will be imparted to the shaft 3.

With some forms of transmissions such as disclosured in my copending application Serial No. 667,478 it may be desirable to enlarge or extend the surface of the heads on the upper ends of the rods which operate the crowder clutches and such a construction is shown in Fig. 8 of the drawings. In other words with the construction disclosed in my copending application it may not be desired to release the crowder clutches until the shifting members are in partial engagement and the engagement of the heads, as described, allows for the rollers which are carried by the links of the shifter fork hub, in their longitudinal movement, to contact with said heads until said shifting members have been moved into partial engagement.

From the above detail description as to construction and operation it will be seen that I have provided a variable speed transmission in which the shiftable members of the driving elements are moved by a hand lever and in which the engaging parts are synchronized so as to prevent any possibility of gear clash. The synchronizing takes effect while the shiftable members are held in their neutral position and there will be a sufficient stopping or retarding of the operating parts after the synchronizing mechanism has been engaged and prior to the movement of the shiftable members into engagement to allow time for the synchronization of the engaging parts. It will be seen that as the operating lever is moved to shift either of the shifting rods 40 or 41 that the engagement of one of the rollers with the head of the rod which operates one of the crowder clutches will cause a depression of the rod and place the spring surrounding the same under compression. The resistance against the operation of the lever slightly increases as the springs are compressed and at the time that the synchonizers are in operation the opposite roller which is carried by the shifting fork hub has been raised to a point where it will engage the depending portion of the hub lock and this will cause a further stopping or retarding in the movement of the lever and additional exertion or pressure will have to be applied to or exerted on the lever to release its engagement with the hub and thereby allow the shifting member to be shifted. It will be seen that the resistance offered to the release of the locking member will be due to the load applied through the links which are causing the engagement of the synchronizing device as well as the spring which holds the locking member yieldingly in its lower position. It can readily be appreciated that if there was no retarding or stopping action of the operating lever that the movement thereof to shift from one speed to another might be so fast as to cause a shifting of the members to engagement prior to proper synchronization and thereby cause gear clash, which is so common in transmissions in which a hand operating lever is employed.

At times it might be desired to add greater resistance in the operation of the lever and if necessary I might connect to the operating lever a dash pot or similar member having the characteristic of a dash pot of increasing resistance as the speed of movement of the lever increases to aid in the retarding movement of the lever, such a construction being disclosed in Fig. 9 of the drawings.

In this figure the hand operating lever is shown at 45 and is connected to a dash pot 161 by means of the rod 162, the dash pot being of any well-known construction so arranged that the retarding action will take place at the proper point where synchronization is desired and be released thereafter.

Having fully described my invention what I claim as new and desire to secure by Letters Patent is:

1. In a power transmission gearing including toothed elements, one of which is shiftable, and engageable and disengageable synchronizing elements, an operating member, a lock for holding the shiftable element in disengaged position, and means for effecting in succession the engagement of the synchronizing elements, release of the lock for the shiftable element, disengagement of the synchronizing elements and movement of the shiftable element by a continuous movement of the operating member.

2. In a power transmission gearing including a shiftable element and synchronizing means, an operating member, a lock for holding the shiftable element in neutral position, means for effecting synchronization, releasing the lock for the shiftable element, and moving the shiftable element by a continuous movement of the operating member, and means for retarding the movement of the operating member after the synchronizer has been set into operation and prior to movement of the shiftable element.

3. In a power transmission gearing including toothed elements one of which is a shiftable element and engageable and disengageable synchronizing elements, a slidable member engageable with the shiftable element, means for effecting engagement of the synchronizing elements, means for operating the slidable member for moving the shiftable element, means for locking the slidable member until the synchronizing means has been placed in operation, and means for releasing the locking means upon disengagement of the synchronizing elements.

4. In a power transmission gearing including a shiftable element and synchronizing means, a slidable member engageable with the shiftable element, means for locking the slidable member for holding the shiftable element in neutral position, an operating member, and means operable by the operating member to successively cause the synchronizing means to operate, release the locking member, render the synchronizing means ineffective, and move the slidable member to operate the shiftable element.

5. In a power transmission gearing including a shiftable element and synchronizing means, a movable member for operating the shiftable element, an operating element, and links connecting the operating element with the movable member, said links being engageable with the synchronizing means for causing the operation thereof.

6. A power transmission gearing including a shiftable element and synchronizing means, a movable member for operating the shiftable element, a shifter device, links connecting the shifter device with the movable member, and a lock for normally holding the movable member to position the shiftable element in neutral position, said links being adapted upon movement of the shifter device to successively set into operation the synchronizing means and release the lock.

7. A power transmission gearing including a shiftable element and synchronizing means, a movable member for operating the shiftable element, a shifter device, and connections between the shifter device and movable member, said connections allowing a relative movement of the shifter device with respect to the movable member, and forming a permanent connection for operating the movable member and shiftable element.

8. A power transmission gearing including a shiftable element and synchronizing means, a movable member for operating the shiftable element, a shifter device, and pivotal connections between the shifter device and movable member, said pivotal connections allowing a relative movement of the shifter device with respect to the movable member, and forming a permanent connection for operating the movable member and shiftable element.

9. A power transmission gearing including a shiftable element and synchronizing means, a movable member for operating the shiftable element, a shifter rod, and pivotal connections between the shifter rod and the movable member, said pivotal connections being adapted to successively set into operation the synchronizing means and operate the movable member.

10. A power transmission gearing including a shiftable element and synchronizing means, a movable member for operating the shiftable element, a lock for normally holding the movable member in position to retain the shiftable element in one position, a shifter rod, and connections between the shifter rod and movable member, said connections successively effecting operation of the synchronizing means, the lock, and movable member.

11. A power transmission gearing including a shiftable element and synchronizing means, a movable member for operating the shiftable element, a lock for normally holding the movable member in position to retain the shiftable element in one position, a shifter rod, and connections between the shifter rod and movable member, said connections successively effecting operation of the lock and movable member.

12. A power transmission gearing including a shiftable element and synchronizing means, a shifter rod mounted for sliding movement, a movable member mounted for sliding movement relative to the rod and for operating the shiftable element, a releasably mounted lock adapted for engaging the movable member for holding the same in position to retain the shiftable element in one position, means for operating the shifter rod, and means movable with the shifter rod for successively effecting operation of the synchronizer, releasing the lock, and operating the movable member.

13. A power transmission gearing including a shiftable element and synchronizing means, a shifter rod mounted for sliding movement, a movable member mounted for sliding movement relative to the rod and for operating the shiftable element, means for operating the shifter rod, and means movable with the shifter rod for effecting operation of the synchronizing means and movable member.

14. A power transmission gearing including a shiftable element and synchronizing means, a shifter device, a movable member associated with said shifter device and adapted to operate the shiftable element, means connecting the shifter device and movable member, and means interposed between the synchronizing means and connecting means and adapted to be actuated by said connecting means for effecting operation of the synchronizer.

15. A power transmission gearing including a shiftable element and synchronizing means, a shifter device, a movable member associated with said shifter device and adapted to operate the shiftable element, means connecting the shifter device and movable member, and yieldable means interposed between the synchronizer and connecting means and adapted to be actuated by said connecting means for effecting operation of the synchronizer.

16. A power transmission gearing including a pair of shafts, a power gear secured to one of said shafts, a conical bearing secured to the other of said shafts, a normally freely rotatable power gear mounted on said conical bearing and in constant mesh with the other power gear, a shiftable element mounted on said shaft carrying the normally freely rotatable gear, means for moving said normally freely rotatable gear relative to the conical bearing for synchronizing the speed of said normally freely rotatable gear with the speed of the shiftable element, and means for moving the shiftable element into engagement with the normally freely rotatable gear for positively connecting said gear to the shaft.

17. A power transmission gearing including a pair of shafts, a power gear secured to one of said shafts, a normally freely rotatable power gear carried by the other shaft and constantly in mesh with the first mentioned power gear, a shiftable element carried on that shaft having the normally freely rotatable power gear, means for moving said normally freely rotatable power gear with respect to the shaft and to cause synchronizing of the speed of said gear to the speed of the shiftable element, and means for moving the shiftable element into engagement with the normally freely rotatable gear for positively connecting said gear to the shaft.

18. A power transmission gearing including a pair of shafts, a power gear secured to one of said shafts, a normally freely rotatable power gear carried by the other shaft and constantly in mesh with the first mentioned power gear, a shiftable element carried on that shaft having the normally freely rotatable power gear, means for moving said normally freely rotatable power gear with respect to the shaft and to cause synchronizing of the speed of said gear to the speed of the shiftable element, and means for moving the shiftable element into engagement with the normally freely rotatable gear for positively connecting said gear to the shaft, the movement of the shiftable element into engagement with the gear being adapted to effect release of the gear relative to the synchronizing means and permit registration of the inter-engageable portions of the gear and shiftable element.

19. A power transmission gearing including a shiftable element and synchronizing means, an operating device associated with the synchronizing means, a shifter rod, a movable member associated with the shifter rod and adapted to move the shiftable element, and pivoted links connecting the shifter rod and movable member, said pivoted links being adapted to engage the operating device for effecting operation of the synchronizing means.

20. A power transmission gearing including a shiftable element and synchronizing means, an operating device associated with the synchronizing means, a movable member for operating the shiftable element, means engageable with the operating device for effecting operation of the synchronizer and for operating the movable member, and means engageable with the device for holding the same in inoperative position.

21. A power transmission gearing including a shiftable element and synchronizing means, an operating device associated with the synchronizing means, a movable member for operating the shiftable element, means engageable with the operating device for effecting operation of the synchronizer and for operating the movable member, and means carried by the movable member and engageable with the operating device for holding the same in inoperative position.

22. A power transmission gearing including a shiftable element and synchronizing means, an operating device associated with the synchronizing means, a head formed on said operating device, a movable member adapted for operating the shiftable element, means for engaging the head for effecting operation of the synchronizing means, means for operating the movable member, and a flange formed on the movable member and adapted to engage beneath the head of the operating device for holding the rod in inoperative position.

23. In a power transmission gearing including a shiftable element and synchronizing means, means for locking the shiftable element in one position, and means for effecting the operation of the synchronizing means, releasing the locking means, shifting the shiftable element, and for increasing the leverage in effecting the synchronizing and decreasing the leverage to release the locking means.

24. A power transmission gearing including an operating lever, a shiftable element and synchronizing means, devices for operating the synchronizing means, a movable member for operating the shiftable element, and common yieldable means positioned between the operating devices and the movable member and operable by the operating lever for actuating the operating devices and the movable member.

25. A power transmission gearing including a shiftable element and synchronizing means, a shifter rod, a rocking member for operating the synchronizing means, a member slidable on the shifter rod for operating the shiftable element, and common means operable by the shifter rod for actuating the rocking member and the member slidable on the shifter rod to effect synchronization and operate the shiftable element.

26. A power transmission gearing comprising a pair of parallel shafts, a pair of gears constantly in mesh mounted on said shafts, one of said gears being normally free to turn on its shaft, a shiftable member mounted on the shaft adjacent the last mentioned gear, said shiftable member and its adjacent free gear each having rigid portions adapted to be moved into engagement for interlocking them together, means separate from the shiftable member for synchronizing the speeds of the free gear and shiftable member, and control means for shifting the shiftable member and for operating the synchronizing means.

27. A power transmission gearing comprising a pair of parallel shafts, a pair of gears constantly in mesh mounted on said shafts, one of said gears being normally free to turn on its shaft, a shiftable member mounted on the shaft adjacent the last mentioned gear, said shiftable member and its adjacent free gear each having rigid portions adapted to be moved into engagement for interlocking them together, means for synchronizing the speeds of the free gear and shiftable member, control means including a shift lever for shifting the shiftable member, and leverage multiplying means for operating the synchronizing means from the control lever.

28. A power transmission gearing comprising two members adapted to be engaged with or disengaged from one another, means for synchronizing the speeds of the members, and control means including a releasable member for imparting a definite predetermined delay in operation to allow time for synchronization.

29. A power transmission gearing including a shiftable element and synchronizing means, a movable member for effecting actuation of the shiftable element, devices for effecting actuation of the synchronizing means, a lever, self adjusting operating instrumentalities between the lever and the synchronizing means actuating devices, and the movable member for actuating the shiftable element, said self-adjusting operating instrumentalities operating in one direction by movement thereof to successively actuate the synchronizing means and movable member and in the other direction to move the shiftable member by a continuous movement therewith.

30. Power transmission mechanism comprising drive and driven members, a shiftable element operatively associated with said members for establishing a driving relation therebetween, synchronizing means including a pair of co-acting conical friction elements within one of said members for establishing the desired speed relation between said members before said driving relation is established, a driving connection between one of said friction elements and one of the members, said driving connection being independent of the shiftable element, means for shifting the shiftable element, and means independent of the movement of the shiftable element for effecting operation of the synchronizing means.

31. Power transmission mechanism comprising drive and driven members, a shiftable element operatively associated with said members for establishing a driving relation therebetween, synchronizing means including a pair of co-acting conical friction elements for establishing the desired speed relation between said members before said driving relation is established, a driving connection between one of said friction elements and one of the members, said driving connection being independent of the shiftable element, said shiftable element and conical friction element being mounted on one of the members, means for shifting the shiftable element, and means independent of the movement of the shiftable element for effecting operation of the synchronizing means.

32. In a power transmission gearing including a shiftable element and synchronizing means, operating means for the shiftable element and synchronizing means including movably related members providing an increasing leverage actuating the synchronizing means as the operating means is operated, and means retarding the movement of the operating means including movably related members effecting a decreasing leverage for releasing the retarding means.

33. A power transmission gearing comprising a pair of parallel shafts, a pair of gears constantly in mesh mounted on said shafts, one of said gears being normally free to turn on its shaft, a shiftable member mounted on the shaft adjacent the last mentioned gear, said shiftable member and its adjacent free gear each having rigid portions adapted to be moved into engagement for interlocking them together, means for synchronizing the speeds of the free gear and shiftable member, the synchronizing means including conical friction elements, means for applying pressure to the synchronizing means to effect synchronization and thereafter release said pressure and means for quickly moving the shiftable element into engagement with its companion in order to jar free the conical friction elements and thus facilitate engagement of the shiftable member and the free gear.

34. A power transmission gearing including a shiftable element and synchronizing means, a movable member for operating the shiftable element, a shifter device, a plurality of sets of links connecting the shifter device with the movable member, and a lock for normally holding the movable member to position the shiftable element in neutral position, one set of links being adapted upon movement of the shifter device to set into operation the synchronizing means while the other set acts to release the lock.

35. A power transmission mechanism including toothed shiftable means and a companion and synchronizing means, means for operating the shiftable means and for effecting synchronization by movement of said operating means in the same general direction throughout its operating movement, a releasable device for holding the shiftable means out of engagement with its companion until synchronization has been effected, and means for retarding the movement of the operating means to afford time for synchronization while the shiftable means is held out of engagement with its companion by said releasable device.

36. Power transmission mechanism including toothed elements, one of which is shiftable into and out of engagement with its companion, and synchronizing means, a releasable device for preventing engagement of the shiftable toothed element with its companion during functioning of the synchronizing means, operating means for effecting synchronization, releasing the releasable means and shifting the shiftable element by movement of the operating means in the same general direction; and a fluid friction brake arranged to retard movement of the operating means in order to afford time for synchronization prior to engagement of the toothed elements.

37. A power transmission mechanism including toothed shiftable means and a companion and synchronizing means; means for operating and shiftable means and synchronizing means during portions of successive forward movements of the operating means, a releasable device for holding the shiftable means out of engagement with its companion until synchronization has been effected, and means for retarding the movement of the operating means while the shiftable means is held out of engagement with its companion by the releasable device.

38. Power transmission mechanism including toothed intermeshable elements and synchronizing means therefor, means for operating the synchronizing means to effect synchronization and to intermesh the toothed elements comprising a manually controllable lever and an elastic device arranged to transmit the movement of the lever to the synchronizing means, and yieldable means including a fluid friction brake arranged to retard the movement of the lever in order to afford time for synchronization prior to the engagement of the toothed elements.

39. Power transmission mechanism including a toothed shiftable member and a companion and synchronizing means, means including a shifter element for operating the shiftable member and for effecting synchronization by movement of said shifter element in the same general direction throughout the operating movement thereof, said operating means including also a device for imparting movement to the synchronizing means in opposite directions; devices for moving the shiftable member in the same general direction as the shifter element, means for releasably holding the shiftable means out of engagement with its companion until synchronization has been effected, and means for retarding movement of the shifter element while the shiftable means is held out of engagement with its companion.

40. Power transmission mechanism including toothed shiftable means and a companion and synchronizing means, means including a shifter element for operating the shiftable means and for effecting synchronization by movement of said shifter element in the same general direction throughout the operating movement thereof, said operating means including also a device for imparting movement to the synchronizing means in opposite directions, a device for moving the shiftable member in the same general direction as the shifter element; means for releasably holding the shiftable means out of engagement with its companion and means including a fluid friction brake for retarding the movement of the shifter element while the shiftable means is held out of engagement with its companion.

41. A power transmission mechanism including a toothed shiftable element and a companion and synchronizing means, an operating device associated with the synchronizing means, a shifter rod, a member associated with and movable with respect to the shifter rod for operating the shiftable element, a releasable device for holding said movable member temporarily stationary, and connecting means between the shifter rod and the movable member adapted and arranged to engage the operating device for effecting operation of the synchronizing means and to release the releasable device in order to permit the movable member to operate the shiftable element.

42. Power transmission mechanism including toothed intermeshable elements and synchronizing means, common means for operating said toothed elements and synchronizing means constructed and proportioned to effect driving relation of the synchronizing means and intermeshing of the toothed elements; and delay mechanism including a fluid friction brake constructed and arranged to oppose movement of said common operating means and to afford time for synchronization prior to the intermeshing of the intermeshable elements.

43. Power transmission mechanism comprising two power transmitting members, each equipped with clutch teeth, engageable and releasable friction elements, one in torque transmitting relation with each of said members, one of said power transmitting members surrounding and movable axially with respect to one of said friction elements, means for effecting frictional driving engagement of said friction elements and thereafter positive power transmitting engagement of said clutch teeth, said means including a shift lever, elastic means interposed between the shift lever and one of said friction elements adapted to transmit a yieldable pressure in order to effect driving engagement of said friction elements prior to engagement of the clutch teeth, said elastic means being constructed and arranged to release the driving engagement of said friction elements in response to continued further movement of the shift lever.

44. Power transmission mechanism comprising coaxial power transmission members equipped with clutch teeth, whereby said members may be coupled or uncoupled, and with synchronizing means, said synchronizing means comprising a pair of coacting conical friction elements disposed concentrically within one of said clutch teeth equipped members; means for establishing a frictional driving connection between said members prior to interlocking the clutch teeth and for thereafter interlocking said clutch teeth; said means consisting of a shift lever and suitable force transmitting connections including an elastically yieldable means through which force applied to the lever is transmitted to the synchronizing means and then released prior to engagement of the clutch teeth.

45. Power transmission mechanism including parallel shafts, a gear fixed on one shaft, a gear in constant mesh therewith revoluble on the other shaft and provided with clutch teeth, an element provided with clutch teeth rotatable with said last named shaft but slidable thereon into and out of engagement with the clutch teeth on said last named gear, a friction clutch element in driving connection with said last mentioned gear and with said other shaft, respectively, one movable into and out of frictional driving engagement with the other, operating means comprising a shift lever, a slider shifter means, a shifter arm on the latter connected with the slidable element provided with clutch teeth, and elastic yieldable connections between the slidable shifter means and movable friction clutch element for transmitting the movement of the shifter means yieldably to said movable friction clutch element said elastic connections being releasable by continued further movement of the shifter means whereby to effect engagement of the clutch teeth.

46. Power transmission mechanism including a shiftable toothed clutch element and companion, synchronizing means including a conical clutch, means for applying pressure to actuate the synchronizing means and then release the pressure, and means for thereafter quickly moving the shiftable toothed clutch element into engagement with its companion so that the shock of impact may loosen the cone clutch elements in order to permit rotative registration adjustment of the toothed clutch elements.

47. Power transmission mechanism including toothed intermeshable elements and synchronizing means; common means for operating said toothed elements and synchronizing means constructed and proportioned to effect driving relation of the synchronizing means and intermeshing of the toothed elements; and delay mechanism constructed and arranged yieldably to resist movement of said common operating means in order to afford time for synchronization prior to the intermeshing of the toothed intermeshable elements, said delay mechanism comprising a device having the characteristic of increasing resistance in proportion to increased speed of movement of said common operating means.

48. In power transmission mechanism the combination of rotary coaxial driving and driven members, each including one element of a jaw clutch and one element of a friction synchronizing clutch; operating means, including a manual shift lever, constructed and arranged to press a movable element of the friction clutch axially into frictional driving engagement with its companion, in order to synchronize the speeds of the driving and driven members thru a frictional coupling, and thereafter to move a movable element of the jaw clutch into interlocking engagement with its companion to positively couple said members; means for releasably locking the movable jaw clutch element out of interlocking engagement with its companion until frictional driving engagement of the synchronizing friction clutch elements has been effected by a first moiety of movement of the shift lever, and means for simultaneously releasing the lock and relieving pressure from the movable element of the friction clutch in response to further movement of the shift lever in the same direction.

49. A combination defined in claim 48 in which the means for releasably locking the movable jaw clutch element out of interlocking engagement with its companion until frictional driving engagement of the friction clutch elements has been effected, comprises yieldable means adapted to bias said locking means toward locking position, said yieldable means and locking means being constructed and arranged to retard the movement of the operating means during release of the locking means.

In testimony whereof I hereunto affix my signature.

EARL A. THOMPSON.

CERTIFICATE OF CORRECTION.

Patent No. 1,873,725.                                                August 23, 1932.

EARL A. THOMPSON.

It is hereby certified that error appears in the printed specification of the above numbered patent requiring correction as follows: Page 10, line 103, claim 37, for "and" first occurrence, read the; page 11, line 115, claim 45, for "slider" read slidable; and that the said Letters Patent should be read with these corrections therein that the same may conform to the record of the case in the Patent Office.

Signed and sealed this 29th day of November, A. D. 1932.

(Seal)                                                M. J. Moore,
                                                         Acting Commissioner of Patents.